United States Patent [19]

Luthi et al.

[11] Patent Number: 4,906,364
[45] Date of Patent: Mar. 6, 1990

[54] FILTER DECK ASSEMBLY SLIDING SEAL

[75] Inventors: Oscar Luthi, Nashua; Armand G. Truchon, East Andover, both of N.H.

[73] Assignee: Ingersoll-Rand Company, Woodcliff Lake, N.J.

[21] Appl. No.: 291,564

[22] Filed: Dec. 29, 1988

[51] Int. Cl.$^4$ .............................................. B01D 33/06
[52] U.S. Cl. ................................ 210/232; 210/380.3; 210/381; 210/404; 209/407
[58] Field of Search ............ 210/232, 236, 238, 380.1, 210/380.3, 381, 402, 404; 209/270, 284, 405, 407

[56] References Cited

U.S. PATENT DOCUMENTS

| | | | |
|---|---|---|---|
| 2,724,507 | 11/1955 | Catalda | 210/404 |
| 3,954,622 | 5/1976 | Kus | 210/404 |
| 4,276,169 | 6/1981 | Browne et al. | 210/404 |

FOREIGN PATENT DOCUMENTS

| | | | |
|---|---|---|---|
| 416485 | 9/1923 | Fed. Rep. of Germany | 210/404 |
| 51779 | 8/1941 | Netherlands | 210/404 |
| 519245 | 3/1940 | United Kingdom | 210/404 |
| 1261037 | 1/1972 | United Kingdom | 210/404 |

Primary Examiner—W. Gary Jones
Assistant Examiner—Wanda L. Millard
Attorney, Agent, or Firm—Robert F. Palermo; Arthur N. Trausch; Walter C. Vliet

[57] ABSTRACT

A rotary drum filter has a plurality of longitudinally extending division grids mounted about the outer circumference of a drum. A plurality of corrugated sheets are provided, with the leading and trailing edges of each sheet mounted to circumferentially adjacent pairs of division grids to define filtrate compartments. An equivalent number of perforated filter plates are also provided. Each filter plate is attached to the top of a corrugated sheet and has a leading edge that is set back from the leading edge of the attached sheet. A seal member is positioned at the leading edge of each corrugated sheet and has a first leg extending between the filter plate and the corrugated sheet. The seal member further includes a second leg which abuts the leading edge of the corrugated sheet so as to block the open ends at the leading edge of the corrugated sheets.

9 Claims, 5 Drawing Sheets

FILTER DECK ASSEMBLY SLIDING SEAL

FIELD OF THE INVENTION

This invention relates to a filter deck assembly for a rotary drum filter and more particularly to a sliding seal for a filter deck assembly.

BACKGROUND OF THE INVENTION

Rotary drum filters are well known and are used in the pulp and paper industry to filter and wash pulp slurries. These filters generally comprise a cylindrical drum mounted for rotation in a tank containing a slurry solution. A filter deck assembly is mounted radially outward of the surface of the drum. As the drum is rotated, a low pressure is maintained inside the drum so that a pulp sheet is formed on the surface of the filter deck. The deck assembly functions to space the pulp from the drum surface to facilitate filtering and drainage. The deck assembly usually includes a drainage deck to direct the filtrate to filtrate compartments. The liquid filtrate is drawn through the filter deck and the drainage deck and into the filtrate compartments by a pressure differential. Filtrate is removed from the filtrate compartments in a conventional manner.

The deck assembly must prevent rewetting of the pulp sheet as the drum rotates through the descending path of the filtrate cycle.

Metal plates having fine perforations are often used as the filter deck. Corrugated sheets attached underneath the filter decks are used as the drainage deck. The metal plates, the corrugated sheets, and the drum may each be made of different metals. The deck assembly of rotary drum filters must be capable of withstanding differential thermal expansion of the component elements due to the temperature variations in presently known filtering cycles. For example, temperature differentials of up to 100° F. expose the deck assembly to heavy thermal shocks once every cylinder revolution.

An object of the present invention is to provide a deck assembly for a rotary drum filter which is constructed and arranged to permit thermal expansion of the component elements without resultant damage.

It is another object of the present invention to provide a deck assembly which effectively prevents rewetting of the pulp sheet from a run back of the filtrate as the drum rotates through the descending path of the cycle.

It is another object of the present invention to provide a deck assembly which is particularly constructed and arranged to allow ready and simple replacement of deck sections.

It is another object of the present invention to provide a deck assembly which is constructed and arranged to be durable.

In general, the foregoing objects are obtained in a rotary drum filter having a plurality of longitudinally extending division grids mounted about the other circumference of a drum. A plurality of corrugated sheets are provided, with the leading and trailing edges of each sheet mounted to circumferentially adjacent pairs of division grids to define filtrate compartments. An equivalent number of perforated filter plates are also provided. Each filter plate is attached to the top of a corrugated sheet and has a leading edge that is set back from the leading edge of the attached sheet. A seal member is positioned at the leading edge of each corrugated sheet and has a first leg extending between the filter plate and the corrugated sheet. The seal member further includes a second leg which abuts the leading edge of the corrugated sheet so as to seal the open ends at the leading edge of the corrugated sheets.

BRIEF DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE PREFERRED EMBODIMENT

Figure 1:
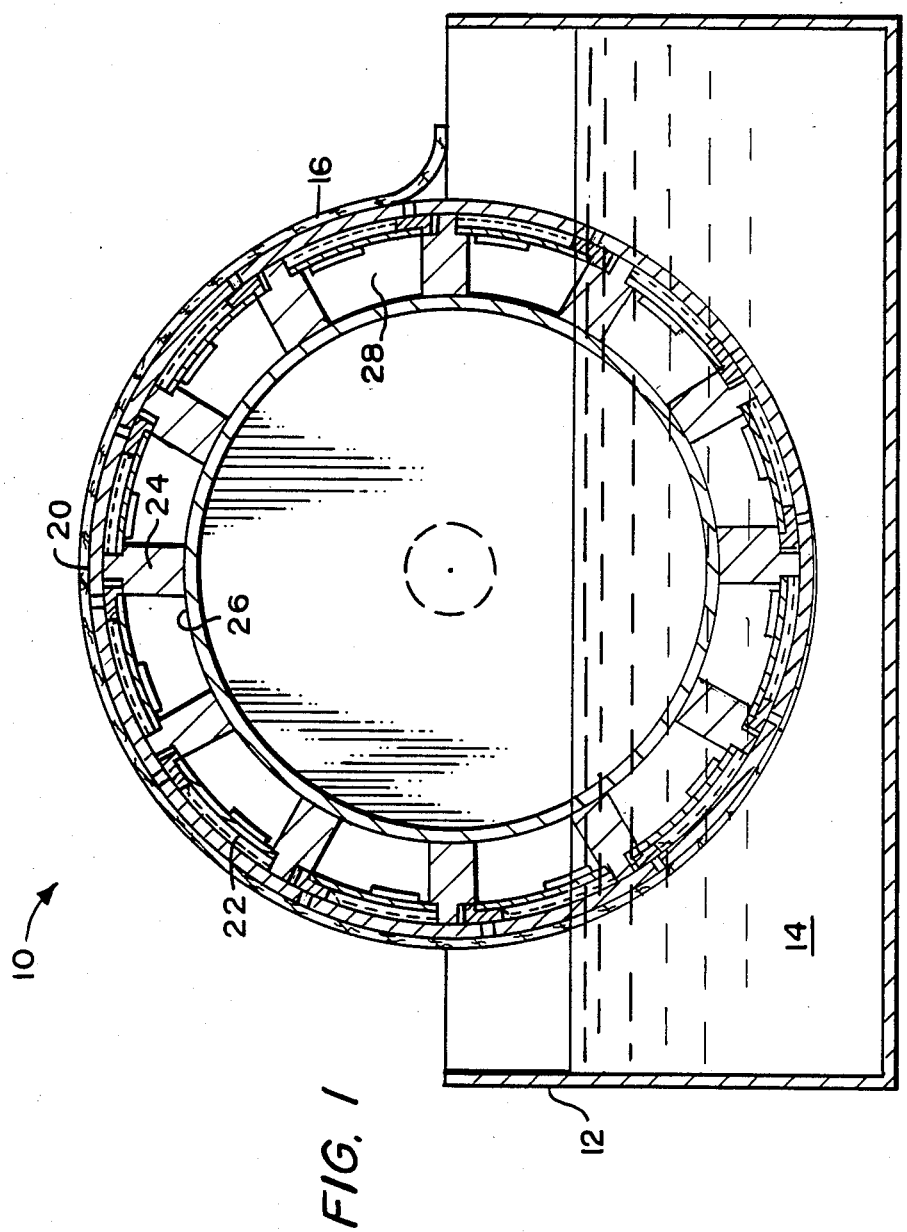
FIG. 1 is a schematic cross-section of a drum filter.

Referring now to the drawings, wherein similar referenced characters designate corresponding parts throughout the several views, the rotary drum filtering apparatus illustrated in FIG. 1 comprises a drum structure, designated generally as 10, at least partially submerged in a tank 12 which contains a pulp stock 14 or other slurry to be filtered. The drum is constructed in the conventional manner so that a pressure or vacuum is applied to drain filtrate and create a pulp sheet 16 on a deck assembly 18. The deck assembly includes a filter deck 20 and a drainage deck 22. As shown in FIG. 1, a plurality of longitudinally extending division grids 24 are mounted on the drum surface 26. The grids are parallel and are spaced evenly about the outer surface of the drum to form filtrate compartments 28 inside the deck assembly. The deck assembly has an appropriate circumferential radius to form a smooth cylindrical outer deck surface around the drum.

Figure 3:
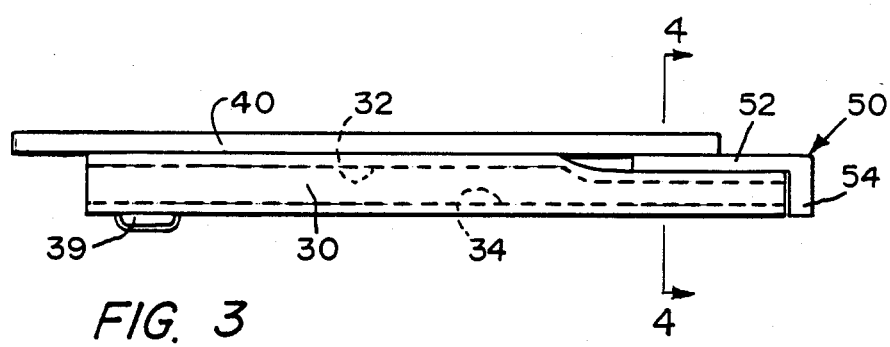
FIG. 3 is a side view of the deck assembly in FIG. 2.
Figure 2:
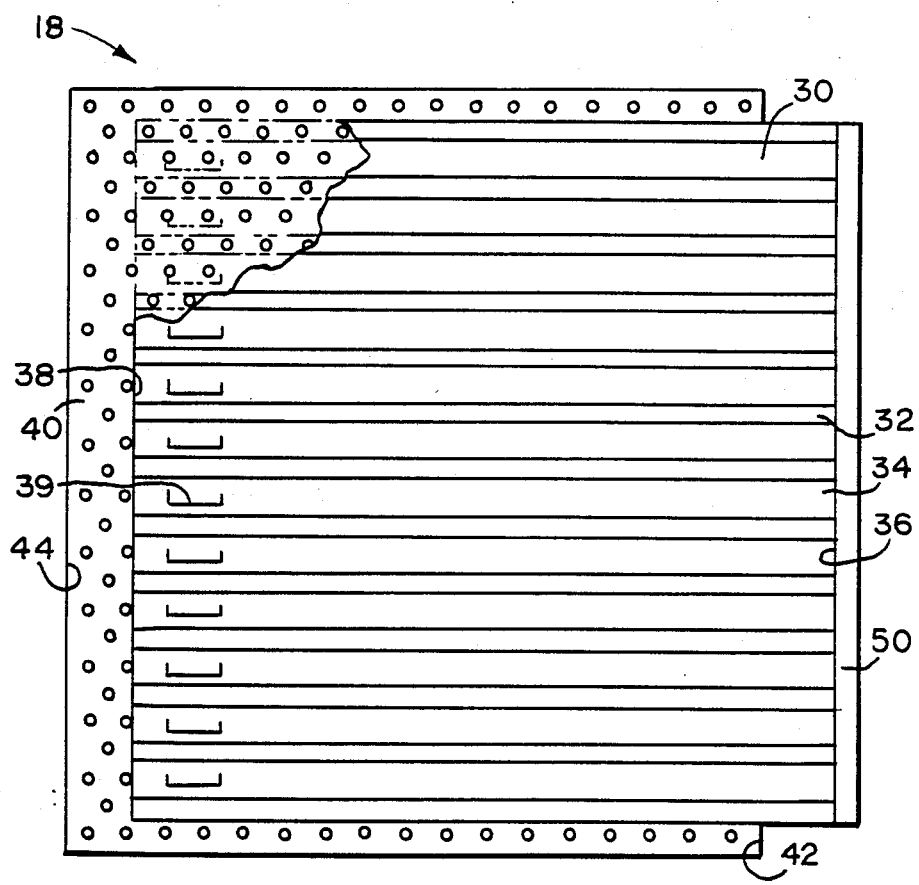
FIG. 2 is a bottom view of a deck assembly according to a preferred embodiment of the present invention.
Figure 4:
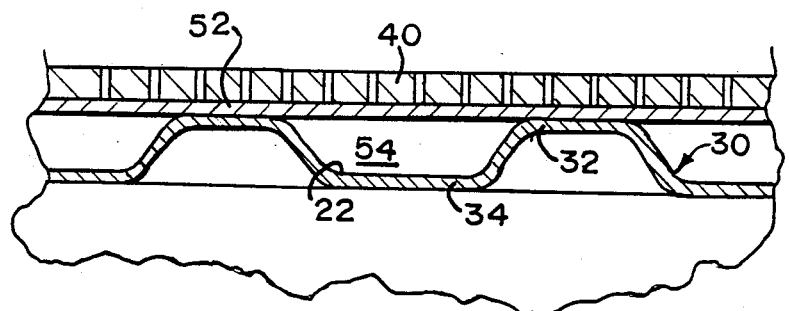
FIG. 4 is a cross-sectional view at 4—4 of FIG. 3.

As best seen in the preferred embodiment of FIGS. 2 through 4, the drainage deck consists of a rectangularly shaped corrugated metal sheet 30 having alternating ridges 32 and channels 34. The ridges and channels extend in the direction of drum rotation from a leading edge 36 of the sheet to a trailing edge 38.

Slots 39 are provided near the trailing edge of each channel for communicating filtrate from the drainage deck to the filtrate compartments. Due to the location of the slots 39 and their operation during the cycle, filtrate flows from the drainage deck 22 into the filtrate compartments 28 during the ascending portion of the drum travel. During the descending portion of travel, the trailing edge location of slots 39 coupled with the leading edge 36 sealing action of sealing member 50 prevents leakage of filtrate from the filtrate compartments 28 which would cause rewetting of the pulp sheet 16.

The filter deck 20 consists of a rectangular metal plate 40 that is attached to the top of a corresponding corrugated sheet. The filter plate is perforated with fine holes and is preferably a corrosion resistant metal such as stainless steel or titanium. The filter plate is preferably attached to the ridges of the corrugated sheet by suitable welds. The leading edge 42 of the filter plate is set back from the leading edge 36 of the attached corrugated sheet. The filter plate extends longitudinally beyond the corrugated sheet on each side so that the filter plate can be attached to radially extending sides of the drum to form the enclosed filtrate compartments 28. In the preferred embodiment of FIGS. 2 and 3, the trailing edge 44 of the filter plate also extends beyond the trailing edge 38 of the corrugated sheet.

An L-shaped sealing member 50 is positioned at the leading edge of each corrugated sheet and has a first leg 52 engaged between the perforated filter plate 40 and the ridges 32 of the corrugated sheet as shown in FIG. 3. The sealing member has a second leg 54 abutting the leading edge of the corrugated sheet so as to close the open ends of the channels 34 and the ridges 32. The seal 50 prevents filtrate in the filtrate compartment 28 from leaking back into the channels of the drainage deck 22 and rewetting the pulp sheet 16.

Figure 9:
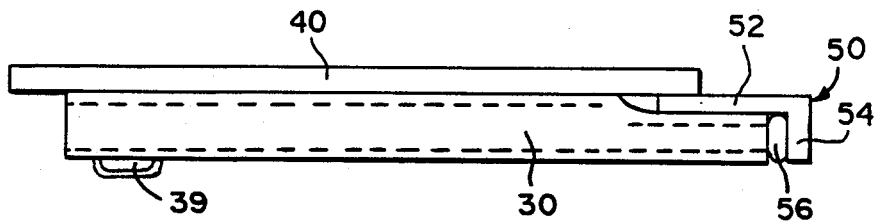
FIG. 9 is a side view similar to FIG. 3 of an alternative embodiment.

In another embodiment shown in FIG. 9, a compliant strip of material 56 is wedged between the second leg 54 of the L-shaped member and the leading edge of the corrugated sheet 30 to provide additional sealing. This may be desirable so as to provide more positive sealing to prevent rewetting. Teflon is a suitable material for the strip 56.

Figure 5:
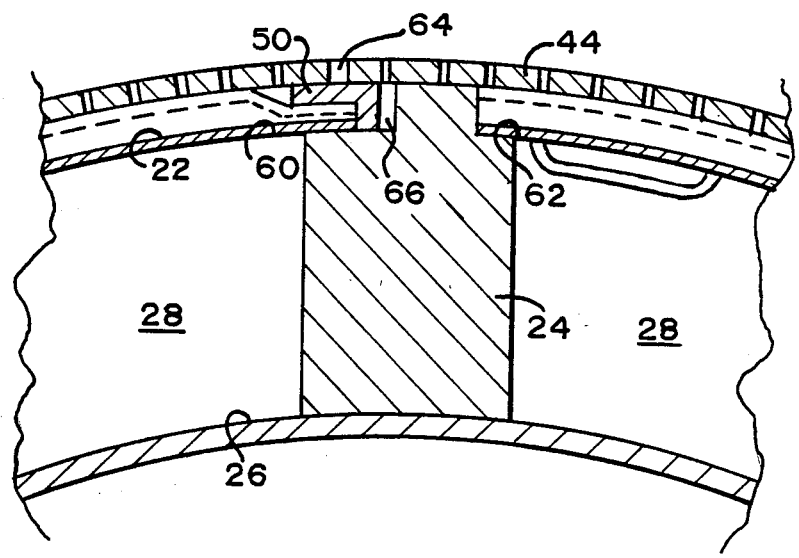
FIG. 5 is an enlarged sectional view of two circumferentially adjacent deck assemblies according to FIG. 2.

As best seen in FIG. 5, the longitudinally extending division grids 24 are provided with two shoulder portions 60 and 62, one on each longitudinal face of the grid. The shoulders are adapted to support the leading edge 36 of one corrugated sheet and trailing edge 38 of a circumferentially adjacent corrugated sheet. The trailing edge 44 of the filter plate is supported and attached to the radially outer surface of the division grid between the shoulder portions. The trailing edge 44, thereby becomes a clamp for the leading edge 36 of the adjacent corrugated sheet 30 and holds it against shoulder 60 so that it is free to slide upon but not to lift from the shoulder. The seal leg 54 prevents filtrate from leaking into the drainage deck 22 from the filtrate compartments 28 and rewetting the pulp. Also, the seal leg 52 prevents filtrate from leaking in or out through the gap 64 between filter plates. Thus, the size of the gap 64 between adjacent filter plates is not critical. Therefore, the circumferential length of each filter plate is not a critical dimension. This minimizes tolerance constraints on the circumferential stack up and allows easier manufacture and assembly of the filter plates.

The gap 64 allows for thermal expansion of each filter plate. Additionally, the gap 66 between the should portion 60 and the leading edge of the corrugated sheet allows for the thermal expansion of each corrugated sheet 30.

Figure 7:
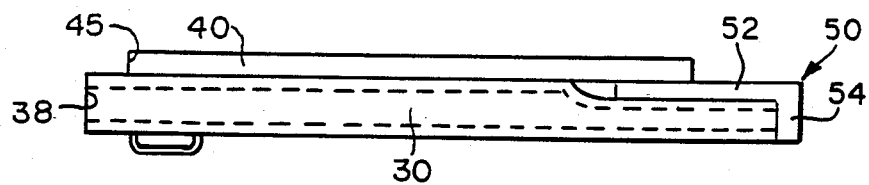
FIG. 7 is a side view of the embodiment of FIG. 6.
Figure 6:
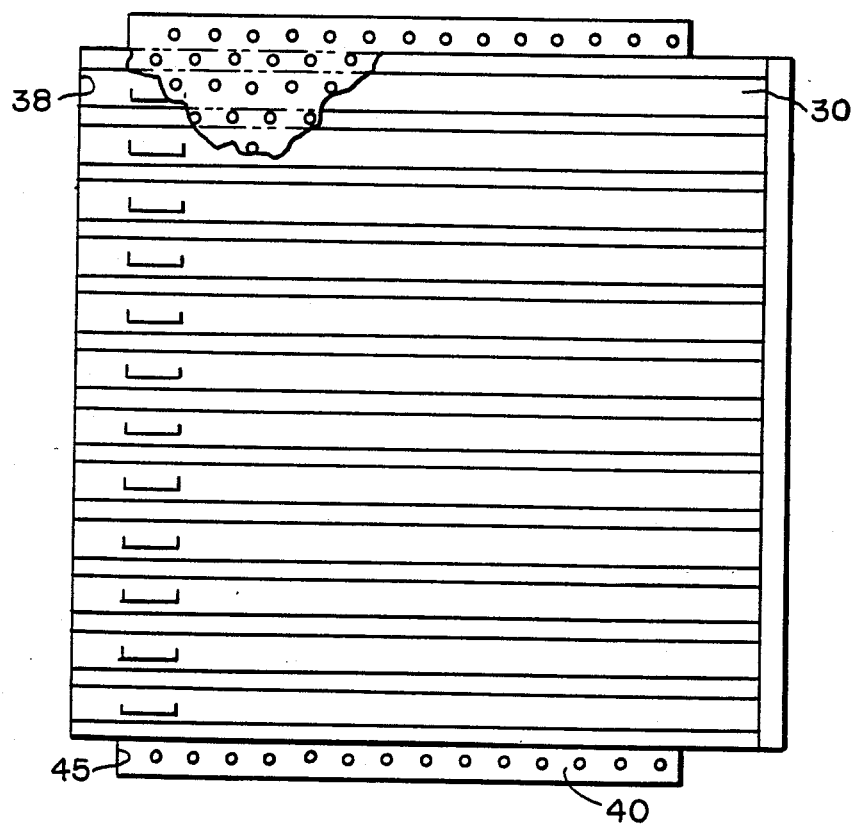
FIG. 6 is a bottom view of a deck assembly of an alternative embodiment.
Figure 8:
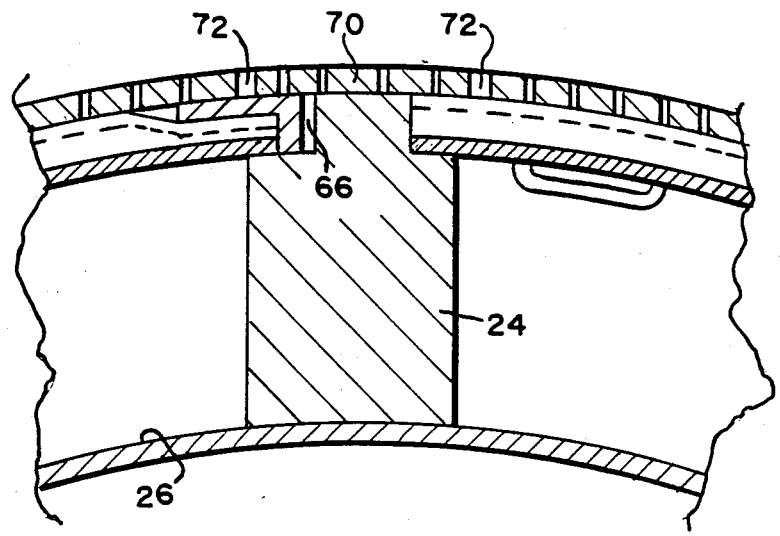
FIG. 8 is an enlarged sectional view of two circumferentially adjacent deck assemblies according to the alternative embodiment of FIGS. 6 and 7.

Another embodiment of the invention includes a separate cap strip 70 to provide a free floating deck assembly as shown in FIG. 8. In this embodiment, the trailing edge 45 of the filter plate 40 is set back from the trailing edge 38 of the corrugated sheet as shown in FIGS. 6 and 7. The size of the gaps 72 between the cap strip and filter plates is not critical for leakage control. The corrugated sheet of the deck assembly are supported by the shoulder portions of the division grids 24.

The longitudinally extending cap strip 70 is attached to the division grid 24 to overlap the leading and trailing edges of the adjacent corrugated sheets. Only the cap strip is attached, preferably by suitable welds, to the division grid. The deck assemblies are free floating and are contained only by the cap strips.

One advantage of this embodiment is that a replaceable cap strip 70 can be removed to free a deck assembly without damaging the deck assemby.

Each of the embodiments of FIGS. 2 and 6 minimizes potential tolerance constraints on the circumferential stackup in the manufacture and assembly of the deck sections. Without the sliding seal 50, the gap between adjacent filter plates would be required to be minimal to control leakage.

Additionally, all of the embodiments allow space for thermal expansion of both the filter plates and corrugated sheets. The deck assemblies of both the embodiments of FIG. 2 which is fixed at the trailing end and the embodiment of FIG. 6 which is free floating can expand without breaking welds or bending parts.

Changes and modification in the specifically described embodiments can be carried out without departing from the spirit and the scope of the invention which is intended to be limited only by the scope of the following claims:

We claim:

1. A deck assembly for a rotary drum filter having a drum mounted for rotation, comprising:
   a plurality of longitudinally extending division grids mounted and spaced in parallel relationship about the outer circumferential surface of the drum;
   a plurality of impervious corrugated sheets each sheet having alternating ridges and channels extending from a leading edge to a trailing edge, the leading and trailing edges of each sheet mounted on adjacent pairs of division grids to define filtrate compartments around the circumference of the drum;
   drainage slots near the trailing edge of each channel for communication to said compartments;
   a plurality of perforated filter plates, each filter plate attached to the top of a corresponding corrugated sheet and having a leading edge that is set back from the leading edge of the corresponding corrugated sheet; and
   a seal member disposed at the leading edge of each corrugated sheet and having a first leg engaged between the filter plate and the corrugated sheet so as to sealingly abut the gap between circumferentially adjacent filter plates.

2. The deck assembly of claim 1 further comprising a shoulder portion on both longitudinal faces of each division grid, the shoulder portions adapted to slidably mount respective leading and trailing edges of circumferentially adjacent corrugated sheets so as to accommodate thermal expansion movement without stress and distortion.

3. The deck assembly of claim 2, wherein each filter plate has a trailing edge which extends beyond the trailing edge of the corresponding corrugated sheet so as to overlap the leading edge of a circumferentially adjacent corrugated sheet.

4. The deck assembly of claim 3 wherein the area near the trailing edge of each filter plate is fixed to the division grid at a position between the shoulder portions in order to slidably secure the leading edge of said circumferentially adjacent corrugated sheet against said shoulder.

5. A deck assembly for a rotary drum filter having a drum mounted for rotation, comprising:
- a plurality of longitudinally extending division grids mounted and spaced in parallel relationship about the outer circumferential surface of the drum;
- a plurality of corrugated sheets each sheet having alternating ridges and channels extending from a leading edge to a trailing edge, the leading and trailing edges of each sheet mounted on adjacent pairs of division grids to define filtrate compartments around the circumference of the drum;
- drainage slots near the trailing edge of each channel for communication to said compartments;
- a plurality of perforated filter plates, each filter plate attached to the top of a corresponding corrugated sheet and having a leading edge that is set back from the leading edge of the correponding corrugated sheet; and an "L" shaped seal member having a first leg engaged between the leading edge of the filter plate and the adjacent corrugated sheet; and
- a second leg sealingly abutting the leading edge of said corrugated sheet.

6. The deck assembly of claim 5 further comprising a compliant strip of material wedged between the second leg of said "L" shaped sealing member and the leading edge of said corrugated sheet.

7. A deck assembly for a rotary drum filter having a drum mounted for rotation, comprising:
- a plurality of longitudinally extending division grids mounted and spaced in parallel relationship about the outer circumferential surface of the drum;
- a plurality of corrugated sheets each sheet having alternating ridges and channels extending from a leading edge to a trailing edge, the leading and trailing edges of each sheet mounted on adjacent pairs of division grids to define filtrate compartments around the circumference of the drum;
- drainage slots near the trailing edge of each channel for communication to said compartments;
- a plurality of perforated filter plates, each filter plate attached to the top of a corresponding corrugated sheet and having a leading edge that is set back from the leading edge of the corresponding corrugated sheet; further having a trailing edge that is set back from the trailing edge of said corrugated sheet;
- a seal member disposed at the leading edge of each corrugated sheet and having a first leg engaged between the filter plate and the corrugated sheet;
- shoulder portions on both longitudinal faces of each division grid adapted to slidably mount respective leading and trailing edges of circumferentially adjacent corrugated sheets; and further comprising; and
- a longitudinally extending cap strip which is fixed to the division grid so as to overlap the leading and trailing edges of the adjacent corrugated sheets.

8. The deck assembly of claim 7 further comprising a second leg on the seal member sealingly abutting the leading edge of said corrugated sheet.

9. The deck assembly of claim 8 further comprising a compliant strip of material wedged between the second leg of said seal member and the leading edge of said corrugated sheet.

* * * * *